(12) United States Patent
Chen (10) Patent No.: US 12,246,794 B2
(45) Date of Patent: Mar. 11, 2025

(54) BICYCLE PEDAL HOOK

(71) Applicant: NING BO QI YING SPORTS EQUIPMENT CO., LTD., Ningbo (CN)

(72) Inventor: Jiaying Chen, Ningbo (CN)

(73) Assignee: NING BO QI YING SPORTS EQUIPMENT CO., LTD., Ningbo (CN)

( * ) Notice: Subject to any disclaimer, the term of this patent is extended or adjusted under 35 U.S.C. 154(b) by 0 days.

(21) Appl. No.: 18/453,287

(22) Filed: Aug. 21, 2023

(65) Prior Publication Data
US 2024/0417029 A1 Dec. 19, 2024

(30) Foreign Application Priority Data

Jun. 19, 2023 (CN) .......................... 202321558049.X (51) Int. Cl.
*B62M 3/08* (2006.01)
(52) U.S. Cl.
CPC ..................................... *B62M 3/08* (2013.01)
(58) Field of Classification Search
CPC ........................................................ B62M 3/08
USPC ........................................................ 74/594.6
See application file for complete search history.

(56) References Cited

U.S. PATENT DOCUMENTS

| | | | | |
|---|---|---|---|---|
| 7,856,905 | B2 * | 12/2010 | Hsieh | B62M 3/086 74/594.6 |
| 10,759,490 | B1 * | 9/2020 | Chen | F16C 23/04 |
| 10,787,226 | B1 * | 9/2020 | Chen | B62M 3/086 |
| 11,124,265 | B1 * | 9/2021 | Liu | B62M 3/083 |
| D973,551 | S * | 12/2022 | Yao | D12/125 |
| D973,552 | S * | 12/2022 | Yao | D12/125 |
| D988,939 | S * | 6/2023 | Gu | D12/125 |
| 2017/0101157 | A1 * | 4/2017 | Hsieh | B62M 3/086 |

* cited by examiner

*Primary Examiner* — Vinh Luong
(74) *Attorney, Agent, or Firm* — Getech Law LLC; Jun Ye (57) ABSTRACT

A bicycle pedal includes a pedal shaft and a pedal body rotating connected with a spindle. The mentioned pedal body is provided with a fixing hook mechanism and a movable hook mechanism for fixing the anti-slip nail. The mentioned fixing hook mechanism includes a first fixing component and a second fixing component which is fixedly attached to the mentioned pedal body. The mentioned second fixing component is rotating connected with the mentioned movable hook mechanism. The mentioned first fixing component and movable hook mechanism clamp together to fix the anti-slip nail. The traditional integrated fixed hook structure is disassembled into two parts, combined with the frame type pedal body, can reduce the gap on the pedal which will attached to the mud, and also makes the pedal structure simpler and clearer, the structure of the parts is relatively independent, makes the mud less likely to attach to the pedal.

7 Claims, 14 Drawing Sheets

BICYCLE PEDAL HOOK

TECHNICAL FIELD

The invention relates to the field of bicycle pedal, in particular to a bicycle pedal.

BACKGROUND

In recent years, cycling has made great strides in both competition and leisure. Therefore, for ergonomic and safety reasons, clipless pedals have been developed that ensure a firm fixation with the shoe so that the shoe does not separate from the pedal with minimal force, and that clipless pedals ensure the active removal of the shoe so that the foot can rest on the ground;

In the traditional clip-free pedal structure, mud is easily stuck between the anti-slip nail clamping part and the pedal shaft of the pedal body, and it is also easy to block the anti-slip nail clamping part. Once the anti-slip nail clamping part is blocked by mud, the anti-slip nail can not be engaged in the anti-slip nail clamping part, and the shoe can not be connected to the pedal, thus causing inconvenience to the users. Hereby, this invention provides a pedal anti-slip nail hook which is not easy to be blocked by mud.

SUMMARY

In order to overcome the defects in the prior art, this invention provides a bicycle pedal. By disassembling the traditional integrated fixed hook structure into two parts and combining with the frame type pedal body, reduce the gap on the pedal that can be attached to the mud, make the pedal structure simpler and clearer, and make the components to be relatively independent, so that the mud is not easily attached to the pedal.

Technical Solution

A pedal, including a pedal shaft and a pedal body which is rotating connected with the spindle. The mentioned pedal body is provided with a fixing hook mechanism and an movable hook mechanism for fixing the anti-slip nail. The mentioned fixing hook mechanism includes a first fixing component and a second fixing component which is fixedly attached to the mentioned pedal body. The mentioned second fixing component is rotating connected with the mentioned movable hook mechanism. The mentioned first fixing component and movable hook mechanism clamp together to fix the anti-slip nail.

Farther, the mentioned first fixing component include a U-shaped fixing part. The middle part of the mentioned U-shaped fixing part is provided with a locking part for locking the anti-slip nail. One side of the mentioned locking part which is near the pedal shaft is provided with a first fitting curved surface to fit into the mentioned first fixing component. The lower side of the mentioned locking part can lock the anti-slip nail. The mentioned fixing part is provided with two symmetrical first supporting surfaces for supporting the anti-slip nail. The mentioned fixing part is also provided with a notch. Two first-connecting holes through the fixing part. The first bolt is passed through the mentioned first-connecting holes. The mentioned first bolt fixes the fixing part on the pedal body.

Farther, the mentioned second fixing component includes installation part. The middle part of the mentioned installation part is provided with a second supporting surface for supporting the anti-slip nail. The side of the second supporting surface which is away from the pedal shaft is provided with two blocks fixed on the installation part. Both ends of the mentioned installation part are provided with an ear part extending downward. The mentioned ear part is perforated with a fixing hole. Both sides of the installation part are also perforated with two second-connecting holes. The mentioned second-connecting hole is provided with a second bolt. The mentioned second bolt is threaded to the pedal body and the second fixing component is fixed to the pedal body.

Farther, the mentioned movable hook mechanism includes a connecting shaft passing through two fixing holes. The mentioned connecting shaft is provided with an movable cap. The mentioned movable cap includes two downward connecting parts and a limiting part. The mentioned connecting parts are provided with a through hole. The mentioned connecting shaft runs through the through hole. The side of the mentioned movable cap which is near the pedal shaft is provided with a contact surface capable of contacting the limit with the blocks. The middle or upper part of the mentioned movable cap is also provided with a second fitting curved surface which can be matched with the anti-slip nail. The lower side of the mentioned movable cap at the second fitting curved surface can lock the anti-slip nail.

Farther, a mounting hole is run through the mentioned movable cap. An adjusting bolt is installed in the mentioned mounting hole. The mentioned adjusting bolt includes a head, a threaded part and an adjusting part. The mentioned adjusting part is provided with an adjusting hole in the end surface of the adjusting part. The mentioned adjusting part extends upward into the mounting hole. The mentioned threaded part through and threaded connected with the adjusting nut. A clamping part is arranged on one side of the adjusting nut which is away from the pedal shaft. A clamping hole is arranged through the limiting part to fit the clamping part. The mentioned clamping part extends into the clamping hole and restricts the rotation of the adjusting nut.

Farther, the mentioned connecting shaft is also equipped with two springs which are positioned symmetrically between the connecting part. The mentioned springs include a first-end part and a second-end part. The mentioned first-end part abuts against the lower side of the blocks. The mentioned second-end abuts against the lower side of the adjusting nut.

Farther, the anti-slip nail includes a first-locking surface for fitting the mentioned locking part, a first fitting end for fitting the first fitting curved surface, a second fitting end for fitting the second fitting curved surface, a second-locking surface which is in the lower side of the movable cap for fitting the second fitting curved surface. The lower side of the second fitting end is also arranged a guide surface on the anti-slip nail.

Farther, the pedal body is provided with a first connecting arm and a second connecting arm. The mentioned first connecting arm, the second connecting arm and the pedal body are provided with threaded holes. The mentioned two threaded holes on one side of the first connecting arm are matched with the first bolt. The mentioned two threaded holes on one side of the second connecting arm are matched with the second bolt.

Farther, the upper and lower sides of the pedal body are also provided with wave lines for increasing resistance.

Advantageous Effect

Compared with the prior art, this invention has the following beneficial effects: by disassembling the traditional integrated fixed hook structure into two parts and combining with the frame type pedal body, reduce the gap on the pedal that can be attached to the mud, make the pedal structure simpler and clearer, and make the components to be relatively independent, so that the mud is not easily attached to the pedal.

Reference Signs the pedal shaft 1, a locking part 101, a first fitting curved surface 102, notch 103, first supporting surfaces 104, first-connecting holes 105, first bolt 106, U-shaped fixing part 107, the pedal body 2, installation part 201, ear part 202, second-connecting hole 203, second bolt 204, blocks 205, second supporting surface 206, a fixing hole 207, wave lines 3, connecting shaft 301, movable cap 302, connecting parts 3021, limiting part 3022, clamping hole 3023, contact surface 3024, second fitting curved surface 3025, mounting hole 3026, through hole 3027, adjusting nut 303, clamping part 3031, adjusting bolt 304, threaded part 3041, head 3042, adjusting part 3044, springs 305, first-end part 3051, second-end part 3052, anti-slip nail 4, first fitting end 401, first-locking surface 402, second fitting end 403, second-locking surface 404, guide surface 405, threaded holes 5, first connecting arm 6, second connecting arm 7, fixing hook mechanism 8, a first fixing component 801, and a second fixing component 802, movable hook mechanism 9.

DETAILED DESCRIPTION

In order to better explain the content of this invention, the following is combined with the attached drawings and implementation examples:

As shown in FIG. 1-14, this invention discloses a pedal, include the pedal shaft 1 and a pedal body 2 which is rotating connected with the spindle 1. The mentioned pedal body 2 is provided with a fixing hook mechanism 8 and an movable hook mechanism 9 for fixing the anti-slip nail 4. The mentioned fixing hook mechanism 8 includes a first fixing component 801 and a second fixing component 802 which is fixedly attached to the mentioned pedal body 2. The mentioned second fixing component 802 is rotating connected with the mentioned movable hook mechanism 9. The mentioned first fixing component 801 and movable hook mechanism 9 clamp together to fix the anti-slip nail 4.

Figure 1:
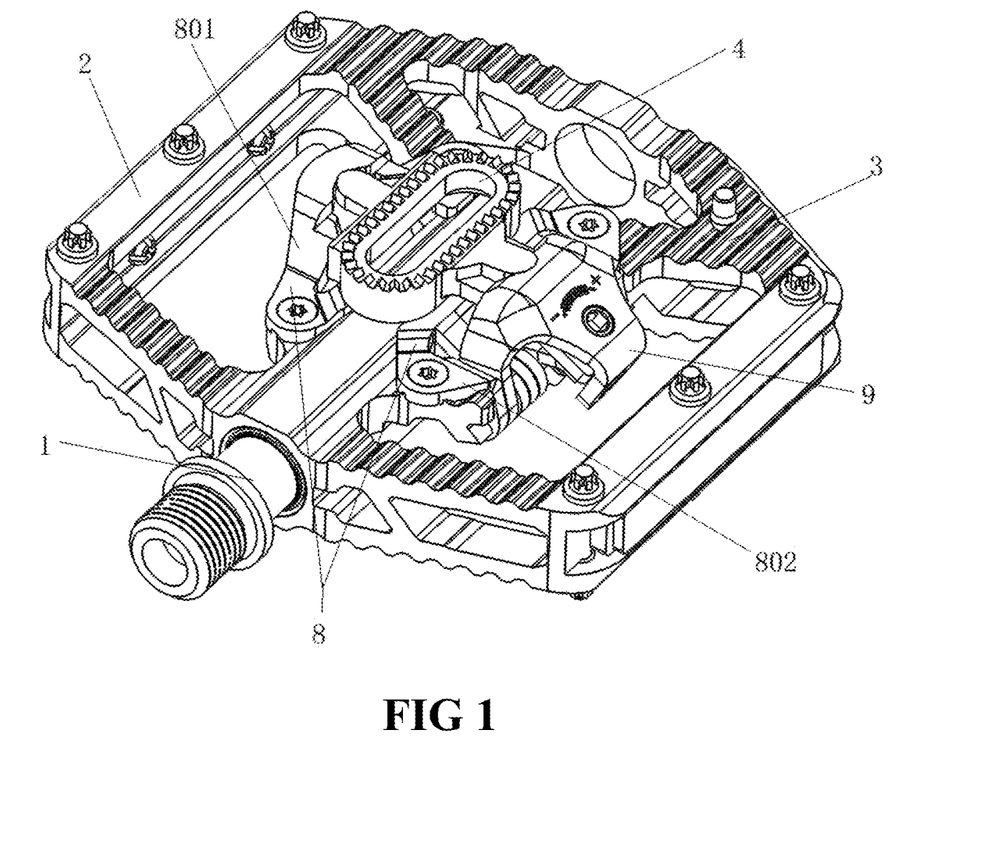
FIG. 1 is a structural diagram of a pedal of this invention.
Figure 2:
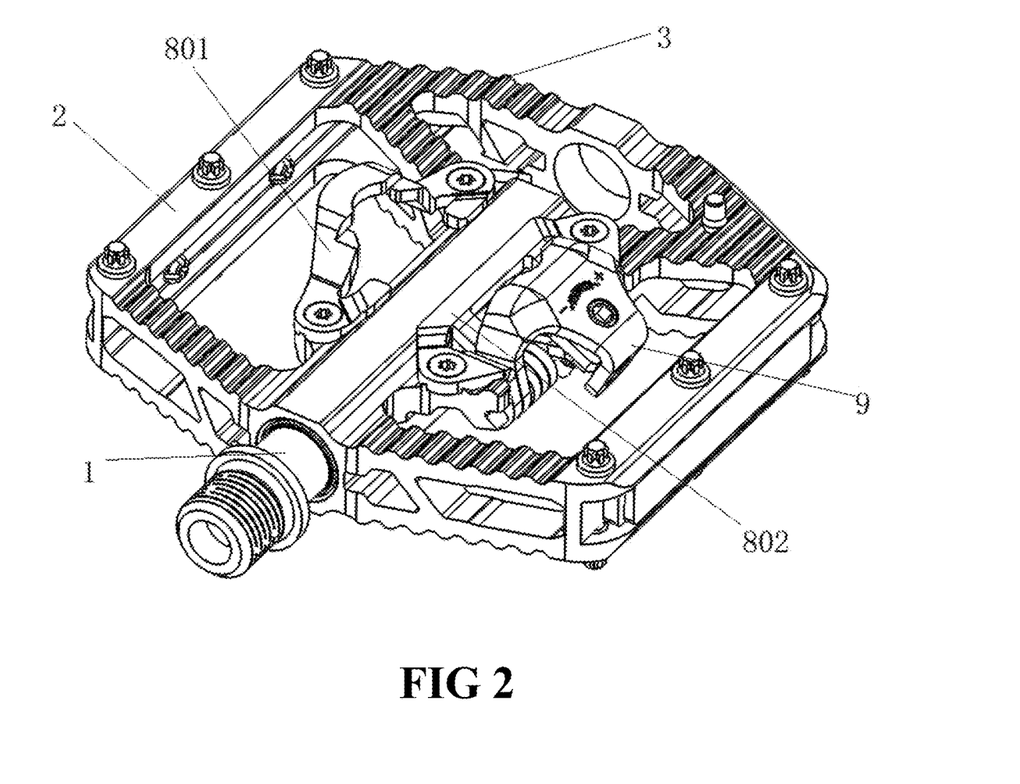
FIG. 2 is the structure diagram of FIG. 1 after removing the anti-slip nails.
Figure 3:
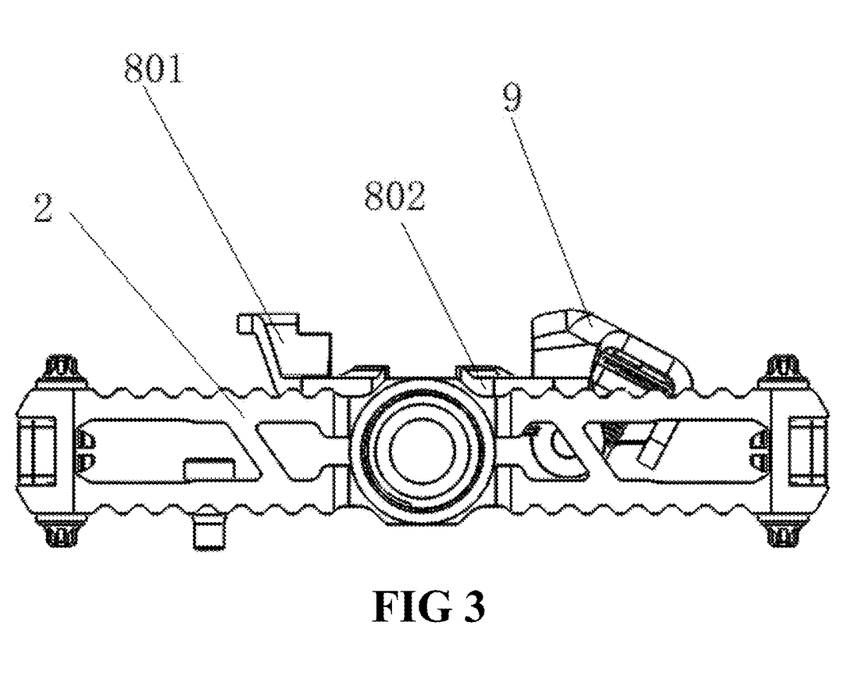
FIG. 3 is the front view of FIG. 2.
Figure 4:
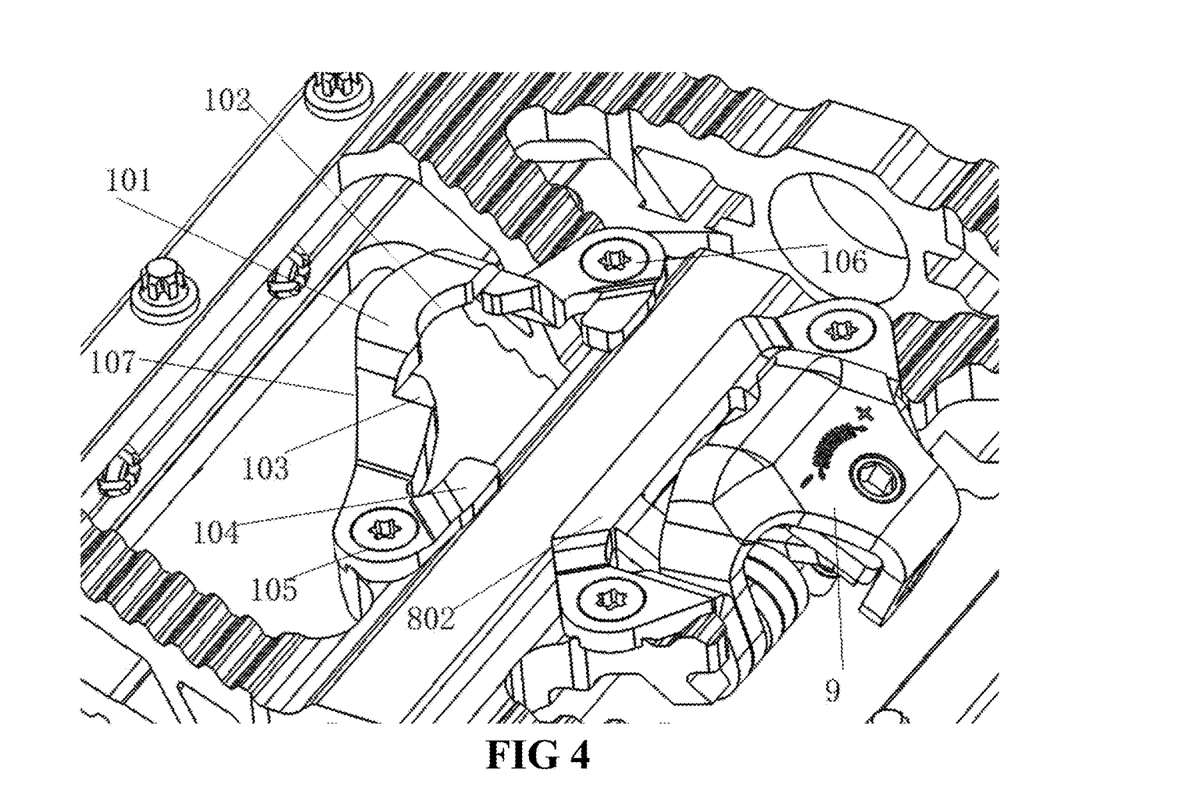
FIG. 4 shows the structure diagram of the first fixing component.

Farther, the mentioned first fixing component 801 includes a U-shaped fixing part 107. The middle part of the mentioned U-shaped fixing part 107 is provided with a locking part 101 for locking the anti-slip nail 4. One side of the mentioned locking part 101 which is near the pedal shaft 1 is provided with a first fitting curved surface 102 to fit into the mentioned first fixing component 801. The lower side of the mentioned locking part 101 can lock the anti-slip nail 4. The mentioned fixing part 107 is provided with two symmetrical first supporting surfaces 104 for supporting the anti-slip nail 4. The mentioned fixing part 107 is also provided with a notch 103. Two first-connecting holes 105 through the fixing part 107. The first bolt 106 is passed through the mentioned first-connecting holes 105. The mentioned first bolt 106 fixes the fixing part 107 on the pedal body 2.

Figure 6:
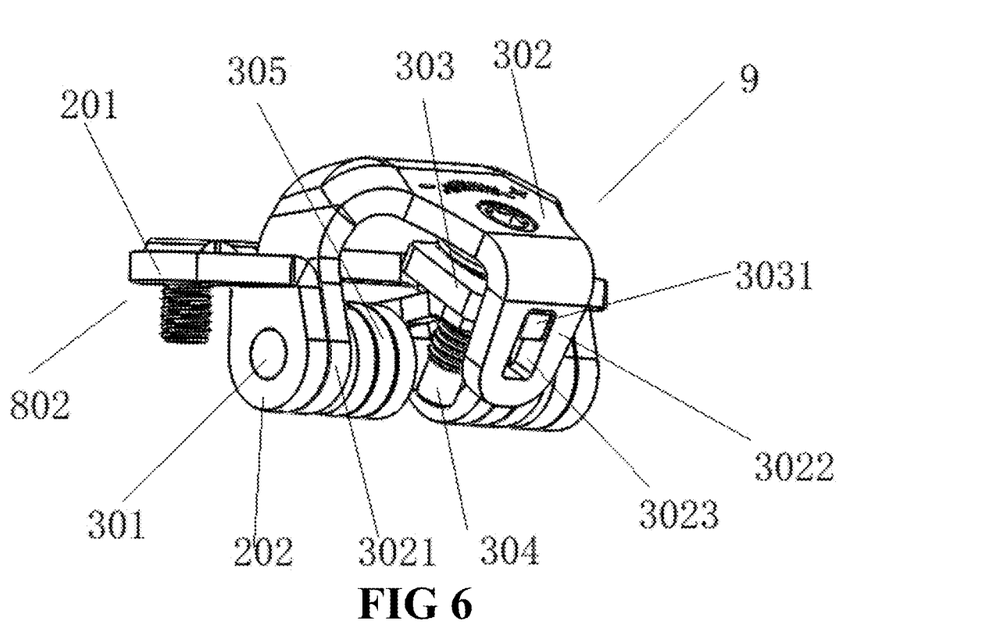
FIG. 6 is the structure diagram of the movable hook mechanism and the second fixing component.
Figure 7:
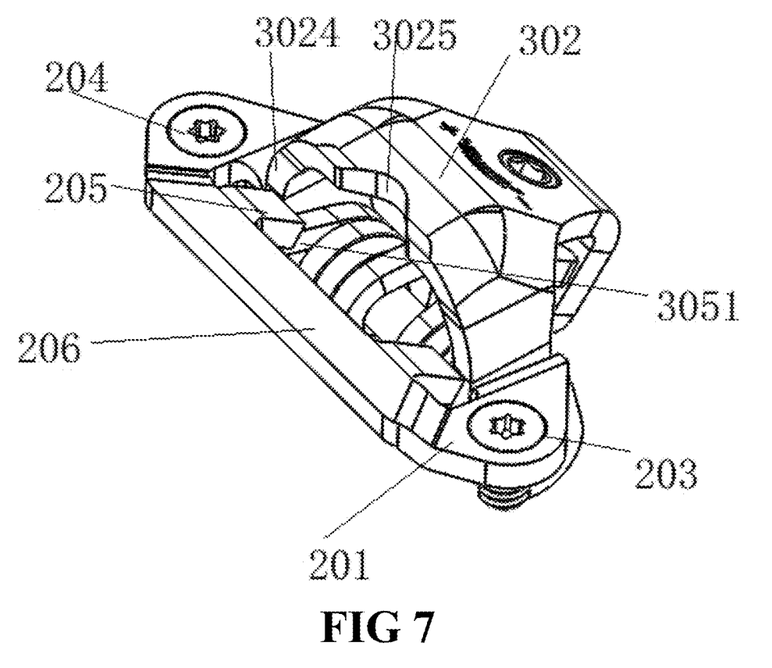
FIG. 7 is the structure diagram of FIG. 6 from different angles.
Figure 8:
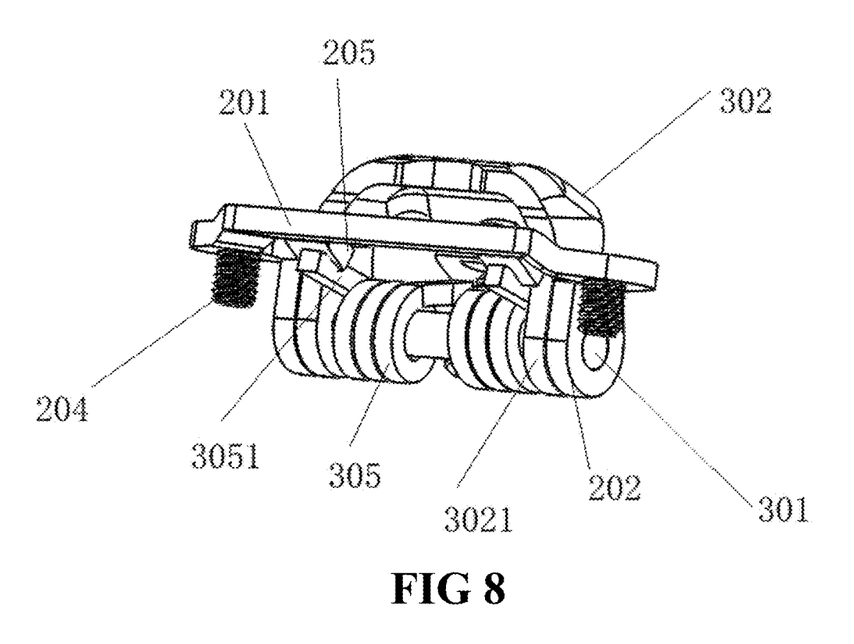
FIG. 8 is the structure diagram of FIG. 6 from different angles.
Figure 9:
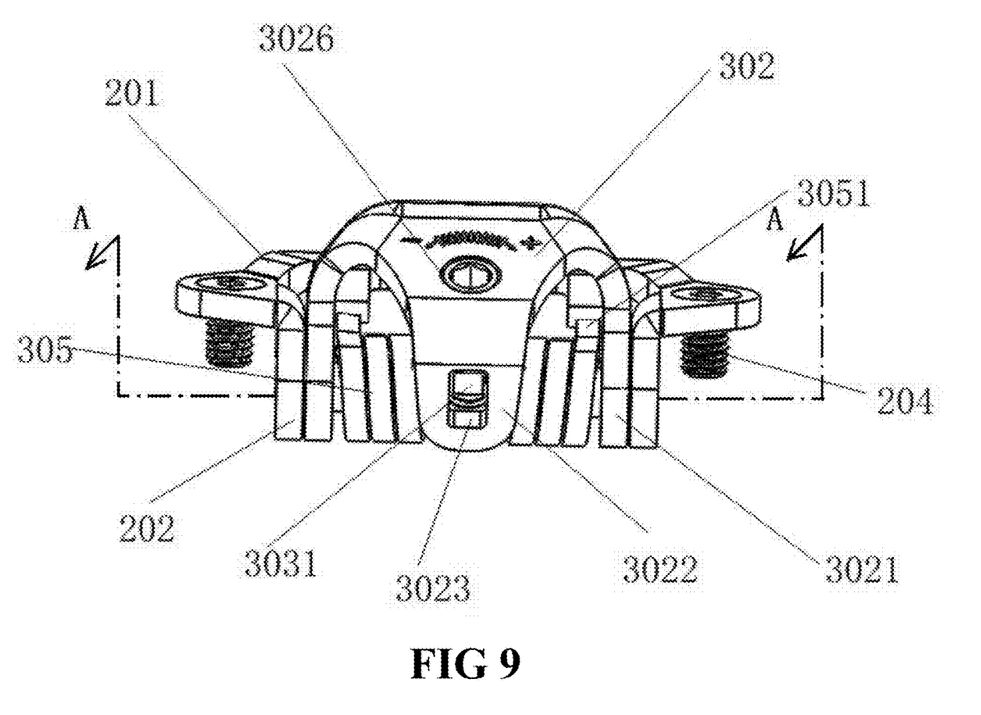
FIG. 9 is the structure diagram of FIG. 6 from different angles.
Figure 12:
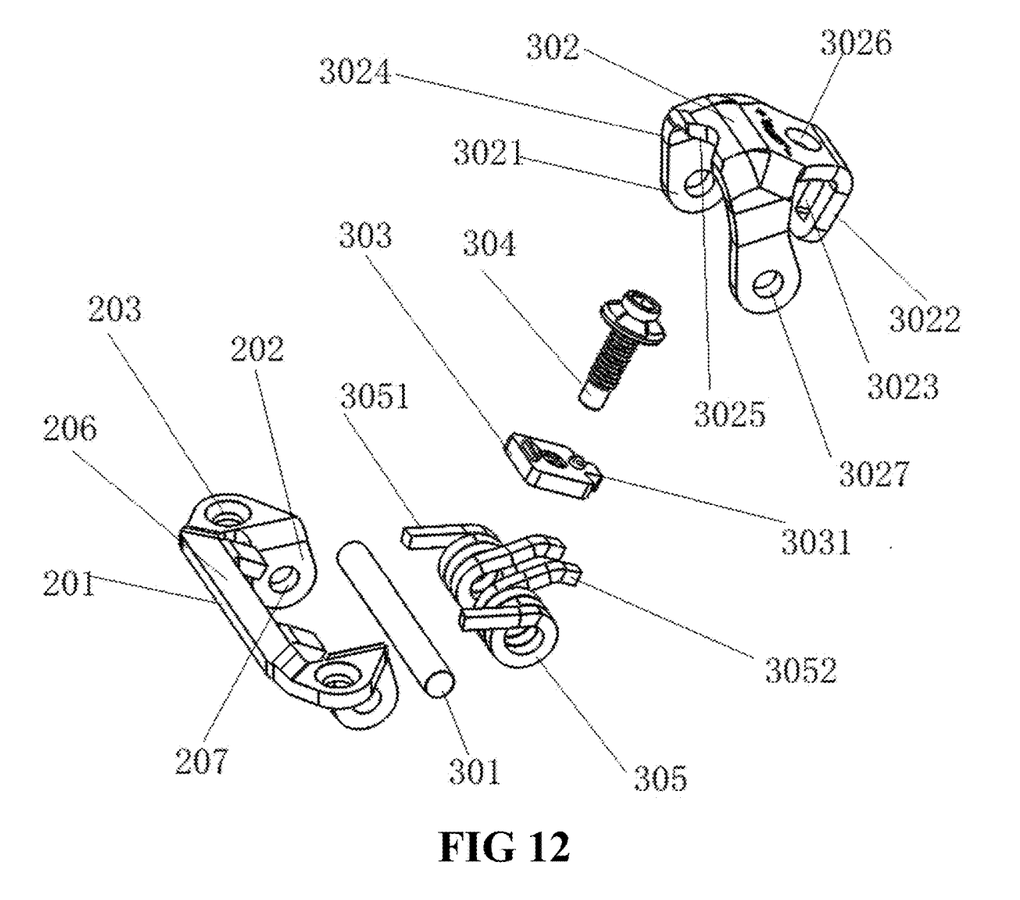
FIG. 12 shows the explosion diagram of the movable hook mechanism and the second fixing component.

Farther, the mentioned second fixing component 802 includes installation part 201. The middle part of the mentioned installation part 201 is provided with a second supporting surface 206 for supporting the anti-slip nail 4. The side of the second supporting surface 206 which is away from the pedal shaft 1 is provided with two blocks 205 fixed on the installation part 201. Both ends of the mentioned installation part 201 are provided with an ear part 202 extending downward. The mentioned ear part 202 is perforated with a fixing hole 207. Both sides of the installation part 201 are also perforated with two second-connecting holes 203. The mentioned second-connecting hole 203 is provided with a second bolt 204. The mentioned second bolt 204 is threaded to the pedal body 2 and the second fixing component 802 is fixed to the pedal body 2.

Farther, the mentioned movable hook mechanism 9 includes a connecting shaft 301 passing through two fixing holes 207. The mentioned connecting shaft 301 is provided with an movable cap 302. The mentioned movable cap 302 includes two downward connecting parts 3021 and a limiting part 3022. The mentioned connecting parts 3021 are provided with a through hole 3027. The mentioned connecting shaft 301 runs through the through hole 3027. The side of the mentioned movable cap 302 which is near the pedal shaft 1 is provided with a contact surface 3024 capable of contacting the limit with the blocks 205. The middle or upper part of the mentioned movable cap 302 is also provided with a second fitting curved surface 3025 which can be matched with the anti-slip nail 4. The lower side of the mentioned movable cap 302 at the second fitting curved surface 3025 can lock the anti-slip nail 4.

Figure 10:
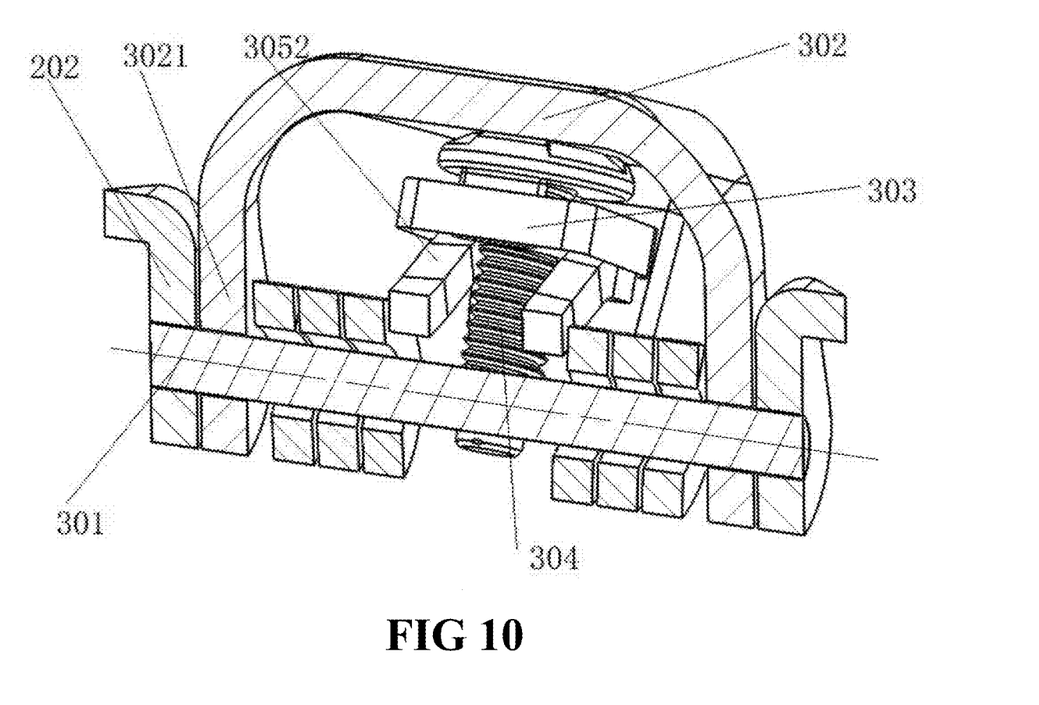
FIG. 10 is a sectional view of the movable hook mechanism cut by the dash-dot line marked as A in FIG. 9.
Figure 11:
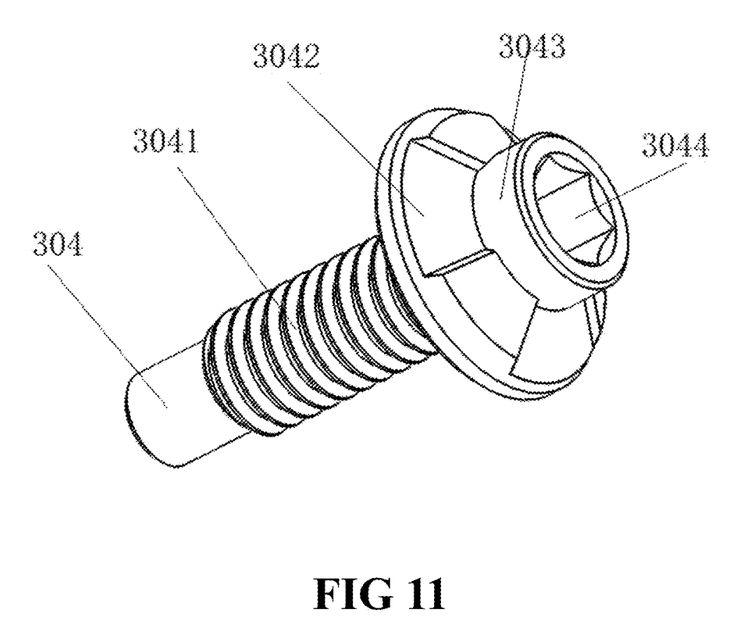
FIG. 11 is the structure diagram of the adjusting bolt.

Farther, a mounting hole 3026 is run through the mentioned movable cap 302. An adjusting bolt 304 is installed in the mentioned mounting hole 3026. The mentioned adjusting bolt 304 includes a head 3042, a threaded part 3041 and an adjusting part 3043. The mentioned adjusting part 3043 is provided with an adjusting hole 3044 in the end surface of the adjusting part 3043. The mentioned adjusting part 3043 extends upward into the mounting hole 3026. The mentioned threaded part 3041 through and threaded connected with the adjusting nut 303. A clamping part 3031 is arranged on one side of the adjusting nut 303 which is away from the pedal shaft 1. A clamping hole 3023 is arranged through the limiting part 3022 to fit the clamping part 3031. The mentioned clamping part 3031 extends into the clamping hole 3023 and restricts the rotation of the adjusting nut 303.

Farther, the mentioned connecting shaft 301 is also equipped with two springs 305 which are positioned symmetrically between the connecting part 3021. The mentioned springs 305 include a first-end part 3051 and a second-end part 3052. The mentioned first-end part 3051 abuts against the lower side of the blocks 205. The mentioned second-end 3052 abut against the lower side of the adjusting nut 303.

Figure 13:
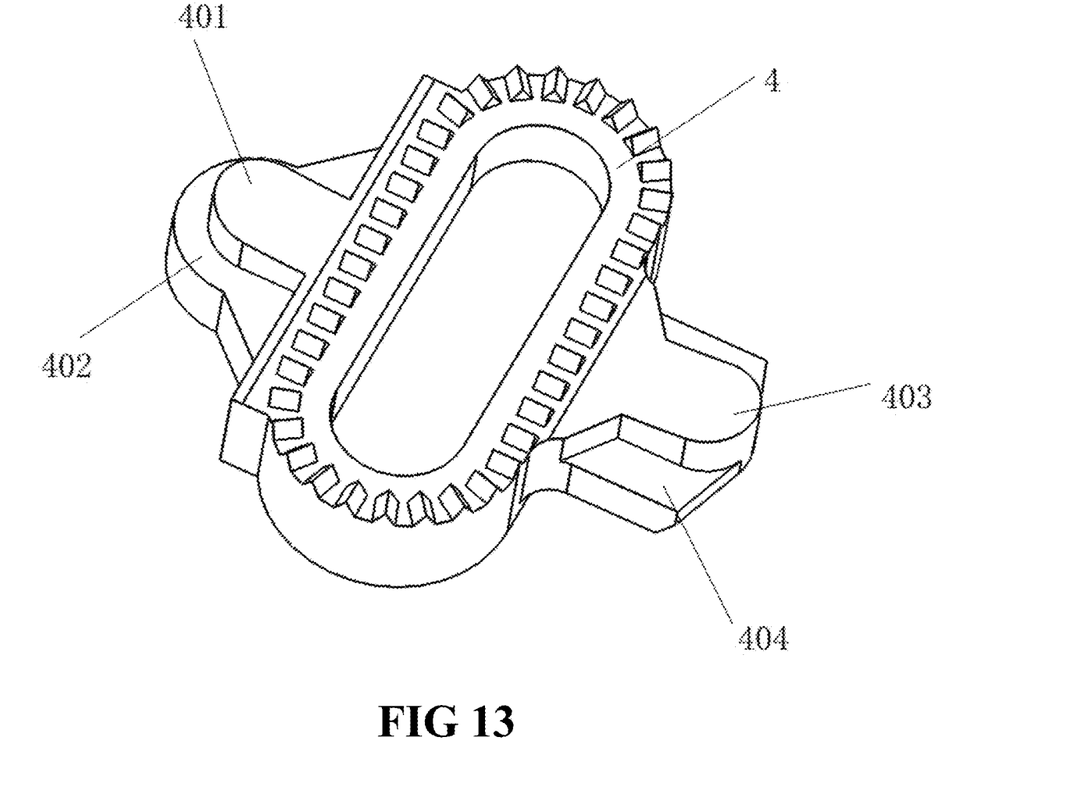
FIG. 13 is the structure diagram of anti-slip nails.
Figure 14:
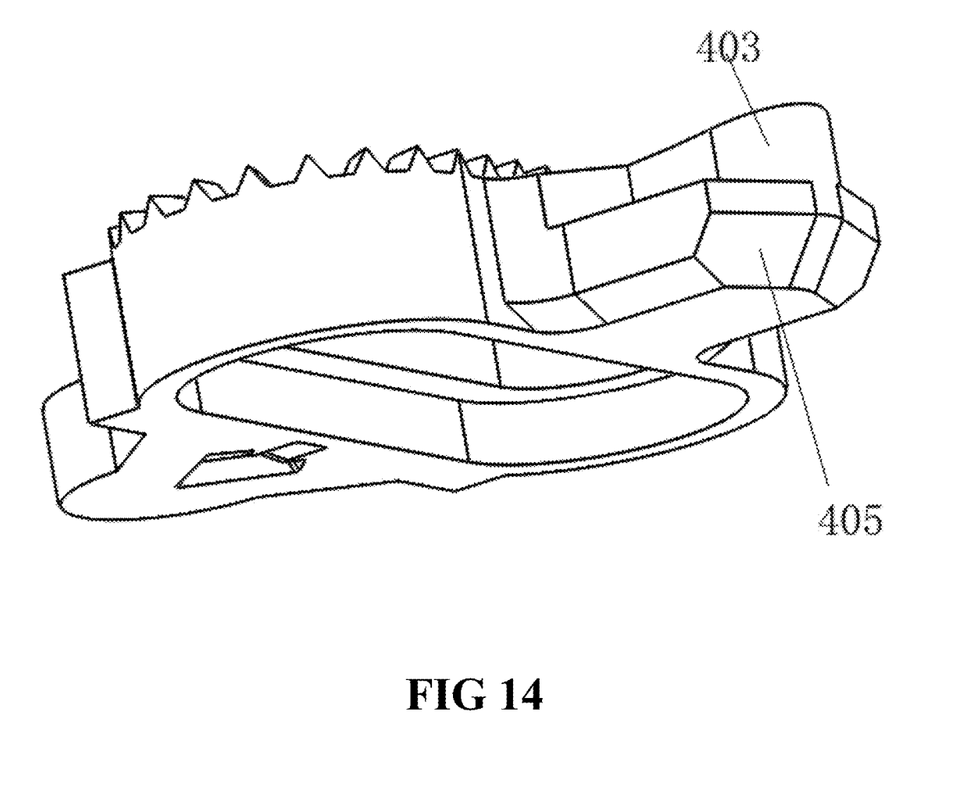
FIG. 14 shows the structure diagram of the guide surface of the anti-slip nail.

Farther, the anti-slip nail 4 includes a first-locking surface 402 for fitting the mentioned locking part 101, a first fitting end 401 for fitting the first fitting curved surface 102, a second fitting end 403 for fitting the second fitting curved surface 3025, a second-locking surface 404 which is in the lower side of the movable cap 302 for fitting the second fitting curved surface 3025. The lower side of the second fitting end 403 is also arranged a guide surface 405 on the anti-slip nail 4.

Figure 5:
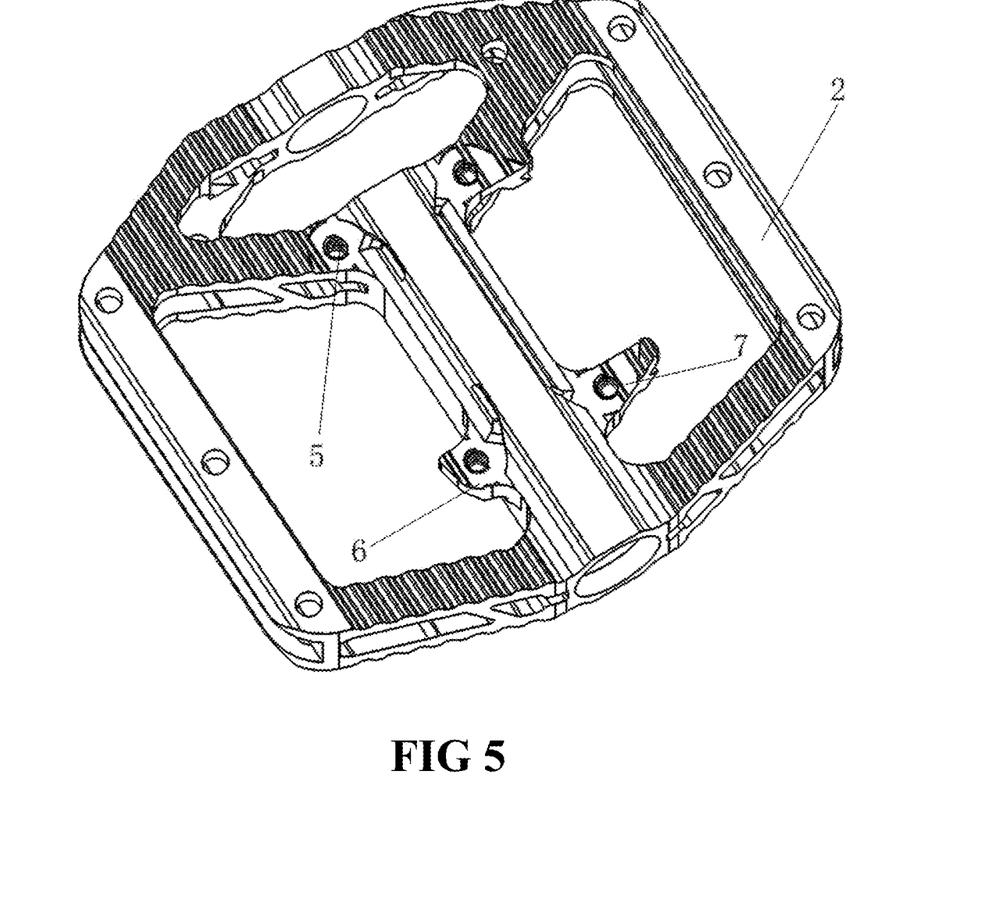
FIG. 5 is the structure diagram of the pedal body.

Farther, the pedal body 2 is provided with a first connecting arm 6 and a second connecting arm 7. The mentioned first connecting arm 6, the second connecting arm 7 and the pedal body 2 are provided with threaded holes 5. The mentioned two threaded holes 5 on one side of the first connecting arm 6 are matched with the first bolt 106. The mentioned two threaded holes 5 on one side of the second connecting arm 7 are matched with the second bolt 204.

Farther, the upper and lower sides of the pedal body 2 are also provided with wave lines 3 for increasing resistance.

Specifically, when lock the anti-slip nail 4, should firstly extend the first-locking surface 402 into the lower side of locking part 101, fit the first fitting end 401 and the first fitting curved surface 102 together, and then press the guide surface 405 against the movable cap 302 and continue to press down, and then the movable cap 302 is squeezed open by the guide surface 405. Thus, the second-locking surface 404 is extended into the lower side of the movable cap 302 and fit second fitting end 403 and the second fitting curved surface 3025 together.

When it needs to be unlocked, take the anti-slip nail 4 rotate around the first fitting curved surface 102, and squeeze apart the movable cap 302 under the action of the second fitting curved surface 3025, so as to turn the anti-slip nail 4 out;

When it needs to adjust the locking pressure of the movable cap, insert the tool into the adjusting part 3044, rotate the tool and drive the adjusting bolt 304 to rotate, and then drive the adjusting nut 303 up and down under the limit action of the clamping hole 3023, so as to continue to squeeze the second-end part 3052 of the spring 305 or release the second-end part 3052 to realize the adjustment of the compression degree of the spring 305. So that to adjust the rebound of the spring 305 to the movable cap 302, and adjust the extrusion pressure of the movable cap 302 to the connection part.

Finally, it should be noted that the above embodiment is only used to illustrate the technical scheme of this invention, but not to limit it; Notwithstanding the detailed description of the technical scheme of this invention by reference to the above-mentioned embodiments, it should be understood by persons skilled in the art that the technical scheme recorded in the aforesaid embodiments may still be modified or some of the technical features equally replaced; Such modification or replacement shall not make the essence of the corresponding technical scheme depart from the spirit and scope of the technical scheme of each embodiment of this invention.

What is claimed is:

1. A bicycle pedal, characterized in comprising a pedal shaft (1) and a pedal body (2) which is rotatably connected with the pedal shaft (1), the pedal body (2) is provided with a fixing hook mechanism (8) and a movable hook mechanism (9), for fastening an anti-slip nail (4), the fixing hook mechanism (8) includes a first fixing component (801) and a second fixing component (802), which are fixedly connected to the pedal body (2), the movable hook mechanism (9) is rotatably connected to the second fixing component (802), wherein the first fixing component (801) and the movable hook mechanism (9) are able to clamp together to fasten the anti-slip nail (4), wherein the first fixing component (801) include a U-shaped fixing part (107); a locking part (101) for locking the anti-slip nail (4) is provided in a middle part of the U-shaped fixing part (107), at a side of the locking part (101) which is close to the pedal shaft (1) is provided with a first fitting curved surface (102) which is configured to fit the first fixing component (801), a lower side of the locking part (101) is configured to lock the anti-slip nail (4), the fixing part (107) is provided with two symmetrical first supporting surfaces (104) for supporting the anti-slip nail (4), the fixing part (107) is also provided with a notch (103), two first-connecting holes (105) are provided in the fixing part (107), a first bolt (106) passes through the first-connecting hole (105), the first bolt (106) fixes the fixing part (107) on the pedal body (2), and:

the second fixing component (802) includes an installation part (201), at the middle part of the installation part (201) is provided with a second supporting surface (206) for supporting the anti-slip nail (4), at a side of the second supporting surface (206) which is away from the pedal shaft (1) is provided with two blocks (205) fixedly installed on the installation part (201), two ends of the installation part (201) are each provided with an ear part (202) extending downward, the ear part (202) is perforated with a fixing hole (207), at two sides of the installation part (201) are provided with two second-connecting holes (203), a second bolt (204) is provided in the second connecting hole (203), and the second bolt (204) is threadedly connected to the pedal body (2) so as to fasten the second fixing component (802) to the pedal body (2).

2. A bicycle pedal according to claim 1, characterized in that: the movable hook mechanism (9) includes a connecting shaft (301) passing through two fixing holes (207), the connecting shaft (301) is provided with a movable cap (302), the movable cap (302) includes two connecting parts (3021) extending downward and a limiting part (3022), each of the connecting parts (3021) is provided with a through hole (3027), the connecting shaft (301) runs through the through hole (3027), at a side of the movable cap (302) which is close to the pedal shaft (1) is provided with a contact surface (3024) which is capable of abutting against the block (205), at a middle or upper part of the movable cap (302) is provided with a second fitting curved surface (3025) capable of abutting against and fitting the anti-slip nail (4), a lower side of the movable cap (302) at the second fitting curved surface (3025) is able to lock the anti-slip nail (4).

3. A bicycle pedal according to claim 2, characterized in that: a mounting hole (3026) is provided in the movable cap (302), an adjusting bolt (304) is installed in the mounting hole (3026), the adjusting bolt (304) includes a head (3042), a threaded part (3041) and an adjusting part (3043), the adjusting part (3043) is provided with an adjusting hole (3044) at an end surface of the adjusting part (3043), the adjusting part (3043) is able to run upward into the mounting hole (3026), the threaded part (3041) runs through and is threadedly connected with an adjusting nut (303), a clamping part (3031) is arranged on one side of the adjusting nut (303) which is away from the pedal shaft (1), a clamping hole (3023), which is configured to fit the clamping part (3031), is provided in the limiting part (3022), the clamping part (3031) runs into the clamping hole (3023), so as to restrict a rotation of the adjusting nut (303).

4. A bicycle pedal according to claim 3, characterized in that: the connecting shaft (301) is sleeved with two springs (305) which are symmetrically positioned between the connecting parts (3021), the springs (305) include a first-end part (3051) and a second-end part (3052), the first-end part (3051) abuts against the lower side of the block (205), the second-end (3052) abuts against the lower side of the adjusting nut (303).

5. A bicycle pedal according to claim 3, characterized in that: the anti-slip nail (4) includes a first-locking surface (402) for fitting the locking part (101), a first fitting end (401) for fitting the first fitting curved surface (102), a second fitting end (403) for fitting the second fitting curved surface (3025), a second-locking surface (404) which is in the lower side of the movable cap (302) for fitting the second fitting curved surface (3025), at a lower side of the second fitting end (403) is provided with a guide surface (405) on the anti-slip nail (4).

6. A bicycle pedal according to claim 1, characterized in that: the pedal body (2) is provided with a first connecting arm (6) and a second connecting arm (7); the first connecting arm (6), the second connecting arm (7) and the pedal body (2) are provided with threaded holes (5); two threaded holes (5) on one side of the first connecting arm (6) are matched with the first bolt (106), two threaded holes (5) on one side of the second connecting arm (7) are matched with the second bolt (204).

7. A bicycle pedal according to claim 1, characterized in that: at upper and lower sides of the pedal body (2) are provided with wave lines (3) for increasing resistance.

\* \* \* \* \*